United States Patent [19]

Schlom et al.

[11] 4,137,058
[45] Jan. 30, 1979

[54] PRE-COOLER

[76] Inventors: Leslie A. Schlom, 5524 Saloma Ave.; Michael B. Dubey, 5518 Saloma Ave., both of Van Nuys, Calif. 91411; Andrew J. Becwar, 818 Old Landmark La., La Canada, Calif. 91011

[21] Appl. No.: 796,800

[22] Filed: May 13, 1977

Related U.S. Application Data

[63] Continuation-in-part of Ser. No. 601,873, Aug. 4, 1975, Pat. No. 4,023,949.

[51] Int. Cl.² ............................ F28C 1/00; F28D 5/00; F25B 1/10
[52] U.S. Cl. ........................................ 62/121; 62/310; 62/510

[58] Field of Search ............................ 62/310, 510, 121; 261/113

[56] References Cited

U.S. PATENT DOCUMENTS 3,543,534  12/1970  Pacault et al. ........................ 62/310

Primary Examiner—Lloyd L. King
Attorney, Agent, or Firm—Nilsson, Robbins, Dalgarn, Berliner, Carson & Wurst

[57] ABSTRACT

An indirect evaporating film heat exchanger having walls defining separated wet and dry sides provide energy-efficient cooling to a gas compression system. In a particular embodiment the heat exchanger supplies a cool dry air stream and a cool moist air stream, respectively, to the power turbine's compressor inlet and intercooler of the gas compression system.

14 Claims, 7 Drawing Figures

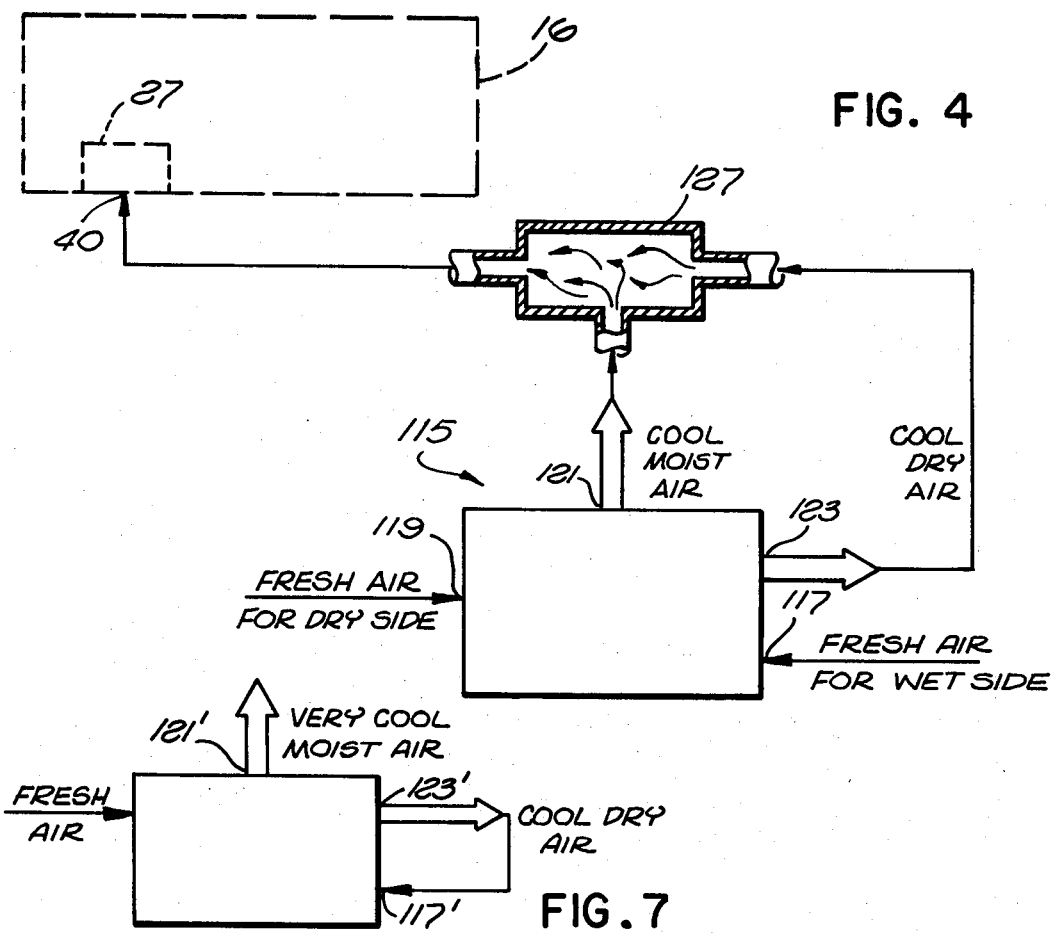
FIG. 4
FIG. 7
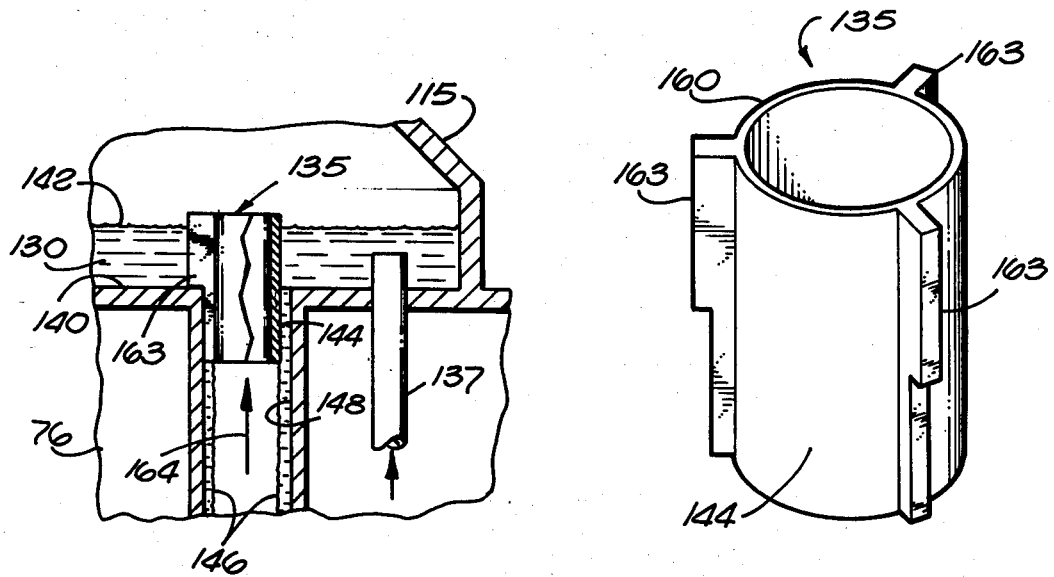
FIG. 5
FIG. 6

PRE-COOLER

CROSS REFERENCE TO RELATED APPLICATION

This application is a continuation-in-part of U.S. Patent application Ser. No. 601,873, filed Aug. 4, 1975 entitled "EVAPORATIVE REFRIGERATION SYSTEM", now U.S. Pat. No. 4,023,949.

FIELD OF THE INVENTION

The field of art to which the invention pertains includes the field of evaporative air cooling, more specifically the field of evaporative air cooling for precooling of air to be used in a gas compression system.

BACKGROUND AND SUMMARY OF THE INVENTION

Gas compression systems for methane, propane and the like, typically consist of two or more gas compressors with the gas flow between each pair cooled by an intercooler, and one or more power turbines which drive the gas compressors through a common drive shaft. A power turbine typically consists of a combustion chamber, turbine and an air compressor which provides compressed air to the combustion chamber. As is well known in the power turbine art, power increases as input air density increases, and air density increases as its temperature decreases. Further, the thermodynamic efficiency increases as inlet air temperature decreases. In addition, as a gas is compressed its temperature increases. Therefore, intercoolers are typically used to cool the gas between compressions stages thereby reducing the power required to further compress the gas in the next stage.

The present invention enables the energy-efficiency of intercooling to be increased. More specifically, the cooling requirements of a gas compression system is efficiently satisfied with an indirect evaporative film heat exchanger having separated dry and wet sides. In one embodiment, the heat exchanger provides a cool dry air stream and a cool moist air stream, respectively, to the power turbine and intercooler of the gas compression system described above. Although the specific type of indirect evaporative film heat exchanger is not critical to the present invention, it must be of the type that separately maintains air cooled on the dry side and air cooled on the wet side. Dry and wet side surfaces are formed by heat conducting walls so that air is cooled on the dry side without moisture absorption by thermal conductive contact with the dry side surface and air is cooled on the wet side by evaporation of water from the wet side surface. Cool dry air from the dry side and cool moist air from the wet side are separately exhausted from the heat exchanger to the power turbine air compressor and intercooler, respectively. Embodiments of this type of heat exchanger are described in our U.S. Patent application Ser. No. 601,873, filed Aug. 4, 1975 and entitled "EVAPORATIVE REFRIGERATION SYSTEM," now U.S. Pat. No. 4,023,949. It will be appreciated that this type of heat exchanger differs from a typical evaporative cooler in which all cooled air has been moistened by direct contact with evaporating water.

A gas compression system is especially suited to utilize the two types of cool air outputs of an indirect evaporating film heat exchanger. The cool moist air is used in the intercooler to cool the gas as it flows between compression stages and then discharged into the atmosphere. The cool dry air is supplied to the turbine air compressor. Thus the invention uses an indirect evaporating film heat exchanger having separated dry and wet sides to supply cooling air to a gas compression system consisting of a power turbine with its associated air compressor and combustion chamber, common drive shaft, gas compressors, and an intercooler interconnecting each pair of gas compressors. Air flowing over the heat exchanger dry side is sensibly cooled, i.e. without the addition of water vapor, and, in an embodiment, is provided to the power turbine air compressor. Air flowing over the heat exchanger wet side is cooled by evaporation therein, thus increasing its moisture content, and is provided to the intercooler to cool the compressed gas as it flows from one compression stage to the next.

A second embodiment provides even cooler air for the turbine air compressor and intercooler by connecting first and second indirect evaporating film heat exchangers in series so that the cool dry air output of the first heat exchanger is utilized as input air to the second heat exchanger. The very cool dry air output of the second heat exchanger is used as input air to the turbine air compressor. The very cool moist air output of the second heat exchanger is combined with the cool moist air output of the first heat exchanger and supplied to the intercooler.

A third embodiment utilizes the entire cool air output of an indirect evaporating film heat exchanger as the input air for a power turbine air compressor. In this embodiment cool dry air and cool moist air from the heat exchanger are combined prior to entering the air compressor, thereby increasing power turbine efficiency and power due to a decrease in inlet air temperature and increase in input air density. In another version of this embodiment cool dry air exiting from the dry side of the heat exchanger passes into the wet side, thereby causing the evaporation of water to take place at the depressed wet bulb temperature of the air. The very cool moist air from the heat exchanger is then directed to the power turbine compressor. It is essential that the moist air used as input air for the air compressor be free from water droplets containing dissolved salts or the like acquired within the heat exchanger. However, moist airstreams from some indirect evaporating film heat exchangers are not free of dissolved salts. Such heat exchangers at least partially accomplish wet side cooling by discharging water droplets into a moving airstream. Evaporation from the water droplet surfaces cools the moving air, but the salts remaining from complete evaporation of some droplets and the salt in partially evaporated droplets are carried along from the heat exchanger as suspended matter by the cool moist air. Evaporation of the droplets within the power turbine ducting creates a salt residue build up which could lower overall turbine life and efficiency. Therefore the heat exchanger used in this embodiment must output cool moist air substantially free from water droplets containing dissolved salts.

Cool moist air substantially free from salt containing water droplets can be obtained with a heat exchanger of certain configuration, modifying our prior heat exchanger of aforenoted application Ser. No. 601,873. In our prior heat exchanger walls are configured as vertically disposed, hollow elongated tubular conduits supported by top and bottom headers and the inner and outer walls of the conduit form the heat exchanger wet side and dry side surfaces, respectively. In modification of our prior heat exchanger, an insert is disposed within the top entrance aperture of each conduit, formed to ensure the discharge of a film of water of substantially uniform thickness over the inner wall of each conduit. The film of water flows downwardly over the inner conduit surface and evaporates in air flowed countercurrently upwardly through the circuit thereby creating cool moist air. The dissolved salts within the water are flushed downwardly by the flowing water. The evaporation from a film of water in flowing air rather than from water droplets suspended in the airstream prevents dissolved salts from contaminating the heat exchanger cool moist air output and damaging the power turbine by salt residue build-up.

Use of an indirect evaporating film heat exchanger having separated dry and wet sides to provide cool air inputs to a gas compression system increases its efficiency by lowering the temperature of the input air to the power turbine and providing cooling between gas compression stages. In this regard, one can refer to the following U.S. Pat. Nos.: 2,186,706, 2,766,886, 2,322,717, and 2,362,714. However, none of these patents disclose the use of an indirect evaporating film heat exchanger to provide cool air inputs to a gas compression system as hereinabove described.

BRIEF DESCRIPTION OF THE DRAWINGS

FIG. 4 is a schematic "circuit" diagram of a power turbine system utilizing an indirect evaporating film heat exchanger where the streams of cool dry air and cool moist air are combined;

FIG. 5 is a diagramatic elevational view of the top portion of the evaporating film heat exchanger showing a water flow control insert and modified water feed conduit;

FIG. 6 is a perspective view of the water flow control insert; and

FIG. 7 is a schematic representation of a further embodiment.

DETAILED DESCRIPTION

Figure 1:
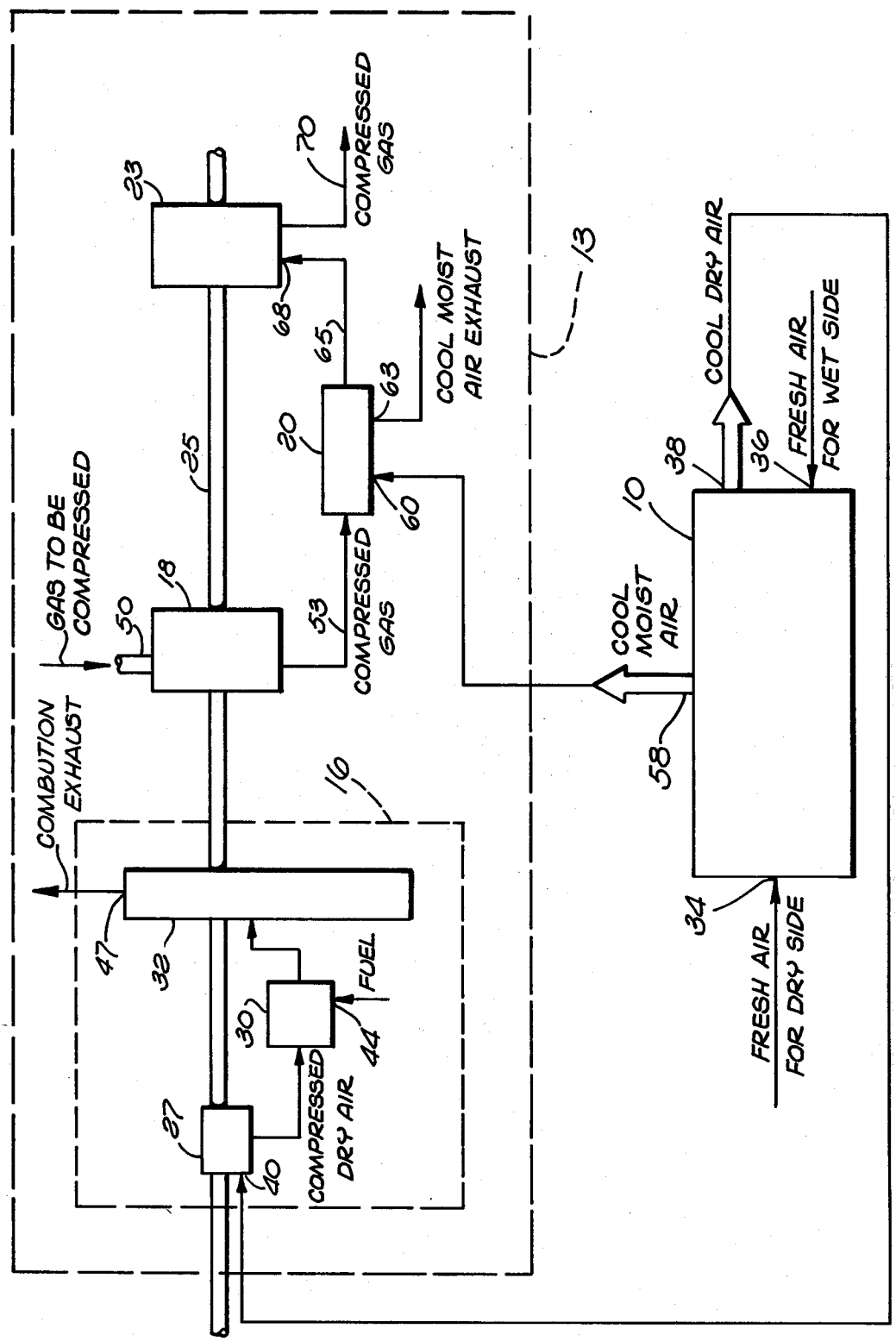
FIG. 1 is a schematic "circuit" diagram of a gas compression system utilizing an indirect evaporating film heat exchanger having separated dry and wet sides.

FIG. 1 shows the components and air flow paths utilized in a first embodiment. Included are an indirect evaporating film heat exchanger 10 and a gas compression system 13 consisting of a power turbine 16, a first gas compressor 18, a first intercooler 20 and a second gas compressor 23. The power turbine 16 consists of an air compressor 27, combustion chamber 30 and turbine 32. In operation, the power turbine 16 drives the first gas compressor 18 and second gas compressor 23 with a common drive shaft 25.

Distribution of the cool air outputs of the heat exchanger 10 to the gas compression system 13 is also shown in FIG. 1. Fresh air for the dry side of the heat exchanger 10 enters a first input port 34 and fresh air for the wet side of heat exchanger 10 enters a second input port 36. Fresh air entering the heat exchanger dry side 10 is sensibly cooled by a process to be explained hereinbelow and supplied via an exhaust port 38 to the power turbine air compressor 27 input duct 40. The air compressor 27 compresses the cool dry air which is then routed to the turbine combustion chamber 30 and mixed with a suitable fuel supplied through a fuel input port 44. Hot gases created during combustion are used to operate the turbine 32 and are then discharged through a turbine exhaust port 47.

The cool moist air output is used as explained below. Gas to be compressed enters the first gas compressor 18 via an input port 50 and, subsequent to compression, is conveyed via a conduit 53 to the first intercooler 20. The temperature of the gas at the first intercooler 20 is considerably higher than it was upon entering the first gas compressor 18. Since the energy required to pressurize a gas is proportional to the inlet gas temperature, it is desirable to cool the gas in order to minimize the energy required by the second gas compressor 23 to effect further compression. The cool moist air from the heat exchanger 10 provides this cooling. It is transferred from the heat exchanger 10 via an exhaust duct 58 to the first intercooler 20 where it enters via an input port 60. Through a heat transfer process within the intercooler 20, as is well known, the temperature of the compressed gas decreases as the temperature of the cool moist air increases. The cool moist air is then exhausted to the atmosphere via an intercooler exhaust port 63. The thus cooled compressed gas is conveyed via a conduit 65 to a gas input port 68 of the second gas compressor 23. Upon further compression by the second gas compressor 23, the further compressed gas is conveyed via conduit 70 to a pipe line or storage tank (not shown).

The first gas compressor 18 and second gas compressor 23 are powered by a common drive shaft 25 connected to the power turbine 16. The gas compression system 13 can incorporate as many compression and cooling stages as is required by a specific application by having each gas compressor output connected through an intercooler with the next gas compressor. Each of these intercoolers could be connected in parallel with the cool moist air output of the heat exchanger 10.

Figure 2:
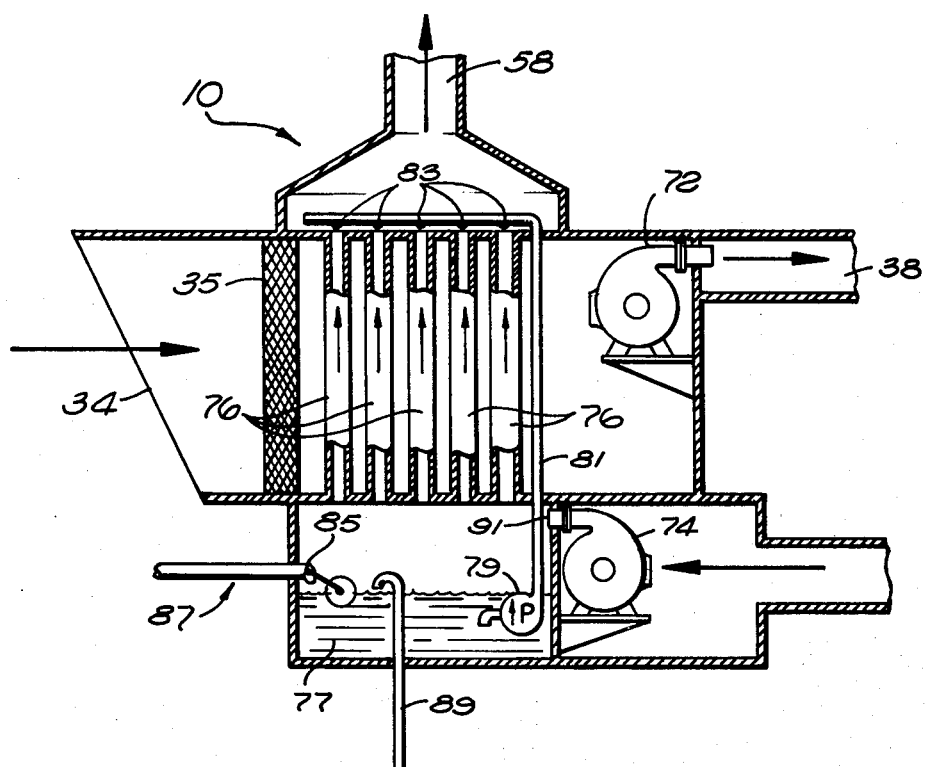
FIG. 2 is a diagramatic elevational view of an indirect evaporating film heat exchanger of the type which has separated dry and wet sides.

FIG. 2 shows an indirect evaporating film heat exchanger which has separated dry and wet sides and is described in detail in our prior application Ser. No. 601,873. Fresh air entering the dry side through a first input port 34, past a filter 35, is sensibly cooled and exits through a cool dry air exhaust port 38, whereas fresh air entering the wet side through a second input port 36 is cooled through an evaporative process and exits through a cool moist air output port 58. The heat exchanger 10 also includes a dry side blower 72, a wet side blower 74 and vertically disposed, hollow elongated tubular conduits 76, the inner and outer walls of which form the heat exchanger wet and dry surfaces, respectively. A water reservoir 77 is formed at the bottom of the heat exchanger and beneath the conduits 76 from which a water pump 79 pumps water through ducting 81 to nozzles 83 disposed over the upper ends of the conduits 76. The water in the reservoir 77 is maintained through a sensing indicator 85 which causes flow through a water supply duct 87 whenever the reservoir water is below a predetermined level. A water overflow tube 89 maintains the maximum volume.

In operation, outside air enters the heat exchanger 10 through a wet side input port 36, is drawn forward into the wet side blower 74 and exhausts through an exhaust port 91. As air is forced upwardly through the hollow elongated conduits 76, it encounters downwardly flowing water along the conduit 76 inner walls, the water having been discharged from the nozzles 83. Water is supplied to the nozzles 83 from the water reservoir 77 by a water pump 79 and appropriate ducting 81. Water which has not evaporated into the upwardly flowing air stream is collected in the water reservoir 77. The upwardly flowing air absorbs moisture as it passes through the tubular conduits 76. As water evaporates from the inner walls of the conduits 76, the flowing air is cooled to a temperature approaching its wet bulb temperature while its humidity is increasing. The cool moist air is then forced through an output port 58 by the wet side blower 74 and routed to the intercooler 20.

On the dry side of the heat exchanger 10, a dry side blower 72 draws outside air through an air input port 34 and across the outer surfaces of the tubular conduits 76. The air is then forced as cool dry air outwardly through an exhuast port 38. The temperature of the inner surfaces of the conduits 76 is lowered as the downwardly flowing water thereon evaporates. The temperature of the outer conduit surfaces is lowered through the process of thermal conduction within the conduit material itself. It is the flowing of the air over these outer surfaces and in thermal conductive contact therewith which results in the sensible cooling of the air. Accordingly, this type of indirect evaporating film heat exchanger provides two types of cool air outputs, the first being one which has been sensibly cooled, and the second being one which has been cooled through the absorption of moisture.

In a second embodiment, two of the above described heat exchangers 10 are connected in series so that the cool dry air output of the first is utilized as the input both to the dry and wet sides of the second and the cool moist air outputs of both are mixed prior to being supplied to an intercooler.

Figure 3:
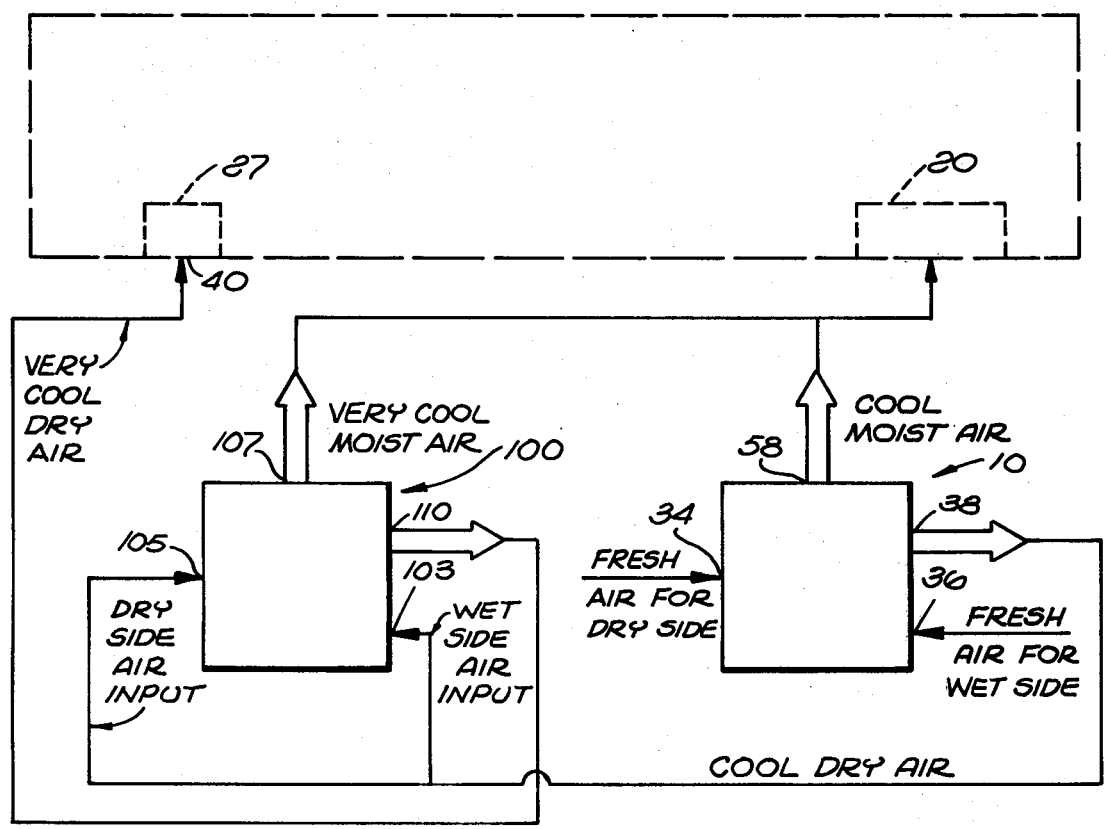
FIG. 3 is a schematic "circuit" diagram of a gas compression system in which two evaporating film heat exchangers are connected in series.

The second embodiment shown in FIG. 3 consists of a pair of evaporating film heat exchangers in series. Both heat exchangers are configured and operate as previously described. Ambient air for the dry side of the first heat exchanger 10 enters through a first input port 34 and ambient air for the wet side of the first heat exchanger 10 enters through a second input port 36. Cool dry air exhausts from the first heat exchanger 10 through a first outlet 38 and cool moist air exhausts through a second outlet 58. The cool dry air output from the first heat exchanger 10 is routed to the second heat exchanger 100 and used as input air to both a wet side input port 103 and a dry side input port 105. The input air, already cooled by passing through the first heat exchanger 10 has a lowered wet bulb temperature which further reduces the temperature of the water film on the wet side of the second heat exchanger 100. Outputs of the second heat exchanger 100 consist of very cool moist air at a first output port 107 and very cool dry air at a second output port 110, the additional cooling being augmented by the depression of the wet bulb temperature caused when the dry air passed through the first heat exchanger 10 and was sensibly cooled.

The cool moist air from heat exchanger 10 and the very cool moist air from heat exchanger 100 are combined and routed to an intercooler 20 for use in the manner heretofore explained. The very cool dry air from heat exchanger 100 is routed to the input duct 40 of the power turbine air compressor 27. Under certain conditions, a configuration of heat exchangers in accordance with this embodiment reduces the energy absorbed by the gas compressor significantly below levels otherwise required, since both the dry and moist output airstreams are cooler than corresponding airstreams obtained with a single heat exchanger.

In a third embodiment, the entire cool air output of an indirect film heat exchanger substantially free of salts is used to cool a power turbine air compressor. Interconnections for this embodiment are shown in FIG. 4. Air for the wet side of a heat exchanger 115 enters at a first input port 117 and air for the dry side of the heat exchanger 115 enters at a second input port 119. Outputs of the heat exchanger 115 are as previously described wherein the cool moist air exits at a first output port 121 and the cool dry air at a second output port 123. The cool moist air and the cool dry air are combined at a point 127 external to the heat exchanger 115 and supplied as input air to the input duct 40 of the power turbine air compressor 27.

Another version of this embodiment is shown schematically in FIG. 7 and provides for cool dry air at 123' to be ducted to enter the wet side of the heat exchanger in lieu of fresh air at 117'. The very cool moist air exiting at 121' is then colder because of the wet bulb temperature depression experienced by the air passing through the dry side of the heat exchanger. The structure of the device of FIG. 7 can be physically identical to that of FIG. 1 of our copending application, filed concurrently herewith entitled DEPRESSED WET BULB WATER COOLER.

The structure of the heat exchanger 115 is somewhat modified compared to the heat exchanger 10 of the first embodiment to ensure that substantially no salt is introduced with exhausted air, and will be covered in detail hereinbelow. Inasmuch as the cool moist air is utilized as an input to a power turbine air compressor 27, it is important that moisture in the cool air does not contain dissolved salts or the like which would collect as residue build-up in the power turbine 16. Referring to FIG. 5, in accordance with this modification, the water discharge nozzles 83 are replaced by a water reservoir 130 which in conjunction with an insert 135 provided at the top of elongated conduits 76, and to be described further hereinbelow, forms a film of flowing water which is substantially controlled to a predetermined film thickness. Air flowing through the conduits 76 will therefore be evaporatively cooled, but dissolved salts in the cooling water will not be carried upwardly by the flowing air but rather will be washed downwardly by the descending film of water. Additionally, by combining the cool moist air and the cool dry air outputs, an additional decrease in specific volume is obtained which, although small, does provide as further advantage because the output power produced by a power turbine system increases significantly for slight decreases in the specific volume of the inlet air.

A water flow control insert 135 installed in the top of each of the conduits 76 is shown in FIG. 5 for one of the conduits 76. Water from the reservoir 77 (FIG. 2) is discharged from a duct 137 so as to flood an upper header 140 supporting the conduits 76 to a predetermined level 142 which is below the top of insert 135. Water flowing between the outer wall 144 of the insert 135 and the inner surface 148 of the conduit 76 creates a downward flowing water film 146 of an initial thickenss determined by the distance between the insert outer wall 144 and the conduit inner surface 148. Support for the insert 135 is provided by a projection on each spacer rib 163.

The insert 135 shown in FIG. 6 consists of a hollow tubular member 160 having at least three spacer ribs 163 formed on the outer periphery. As the insert 135 is installed in the conduit 76 the spacer ribs 163 contact the inner surfaces 148 thereof so that the insert is centered therein. Support for the insert is supplied by an overhanging projection on each spacer rib 163 which rests on the upper header 140. The flow of water along the inner surfaces of the conduits 76 and the initial thickenss of the water thereon is determined by the radial displacement between the ends of the spacer ribs 163 and the outer wall 144 of the insert 135.

As shown in FIG. 5, the gap, so formed between the insert outer wall 144 and the inner surface of the conduit 76 is such as to establish a film of water 146 flowing down the inner surface of the conduit 76, the gap being sufficient to establish enough thickness to the film of water 146 that the film is sustained the full length of the conduit 76 without forming dry areas as the water evaporates into the counterflowing air stream 164. The gap between the insert outer wall 144 and the inner surface of the conduit 76, in this configuration, is at a minimum about 0.10 millimeter and can be as large as about 2 millimeters for long tubes or high air flow rates.

I claim:

1. In a gas compression system having first and second gas compressors, an intercooler connecting said compressors, at least one power turbine to drive said compressors, a combustion chamber to supply combusted gas to drive said turbine, and an air compressor to supply compressed air to said combustion chamber, the improvement comprising:
    an indirect evaporating film heat exchanger having separated dry and wet sides and formed with a first conduit for exhausting cool dry air from the dry side of said heat exchanger, and a second conduit for exhausting cool moist air from the wet side of said heat exchanger;
    means for connecting said first heat exchanger conduit to the air compressor of said power turbine conveying said cool dry air from the heat exchanger to said turbine air compressor for supply thereby to said combustion chamber; and
    means for connecting said second heat exchanger conduit to said intercooler for heat exchange between said intercooler and the cool moist air from said heat exchanger.

2. In a gas compression system having first and second gas compressors, an intercooler connecting said compressors, at least one power turbine to drive said compressors, a combustion chamber to supply combusted gas to drive said turbine, and an air compressor to supply compressed air to said combustion chamber, the improvement comprising:
    an indirect evaporating film heat exchanger having separated dry and set sides and formed with a first conduit for exhausting cool dry air from the dry side of said heat exchanger, and a second conduit for exhausting cool moist air from the wet side of said heat exchanger;
    means for connecting said first heat exchanger conduit to the air compressor of said power turbine whereby said cool dry air from the heat exchanger is conveyed to said turbine air compressor to be supplied thereby to said combustion chamber;
    means for connecting said second heat exchanger conduit to said intercooler for heat exchange between said intercooler and the cool moist air from said heat exchanger;
    a third compressor for further compressing said gas as it exhausts from said second compressor;
    a second intercooler connecting said second and third compressors; and
    the further improvement comprising means for connecting said second heat exchanger conduit to said second intercooler for providing heat exchange between said second intercooler and the cool moist air from said heat exchanger.

3. The improvement of claim 1 including a second indirect evaporating film heat exchanger, means whereby the cool dry air from said first heat exchanger is utilized as the input air for said second heat exchanger, and means for combining in said second conduit the cool moist air from said first and second heat exchangers.

4. In a power turbine system having at least one power turbine, a combustion chamber to supply combusted gas to drive said turbine, and an air compressor to supply compressed air to said combustion chamber, the improvement comprising:
    an indirect evaporating film heat exchanger having separated dry and wet sides and formed with a first conduit for exhausting cool dry air from the dry side of said heat exchanger, and a second conduit for exhausting cool moist air from the wet side of said heat exchanger;
    means for combining the air contained in said first and second conduits and exhausting through a third conduit; and
    means for connecting said air compressor to said third conduit routing said cool dry air and said cool moist air to said air compressor for supply thereby to said combustion chamber.

5. The improvement of claim 4 further comprising means for forming a film of water of predetermined thickness on said heat exchanger wet side.

6. The improvement of claim 5 wherein said thickness is about 0.1 to about 2 millimeters.

7. In a power turbine system having at least one power turbine, a combustion chamber to supply combusted gas to drive said turbine, and an air compressor to supply compressed air to said combustion chamber, the improvement comprising:
    an indirect evaporating film heat exchanger having separated dry and wet sides in the form of an array of vertically directed, spaced hollow elongated conduits wherein said dry and wet sides constitute outer an inner condduit surfaces, respective, and formed with a first conduit for exhausting cool dry air from the dry side of said heat exchanger, and a second conduit for exhausting cool moist air from the wet side of said heat exchanger;
    means for connecting said air compressor to said third conduit whereby said cool dry air and said cool moist air are routed to said air compressor to be supplied thereby to said combustion chamber; and
    means for forming a film of water of predetermined thickness on said heat exchanger wet side comprising means for applying said film of water to said inner conduit surfaces for flow by gravity therethrough.

8. An improved method of gas compression utilizing a first and second gas compressor, an intercooler connecting said compressors, at least one power turbine to drive said compressors, a combustion chamber to supply combusted gas to drive said turbine, and an air compressor to supply compressed air to said combustion chamber, the improvement comprising:

exhausting cool dry air from the dry side of a first indirect evaporating film heat exchanger having separated dry and wet side walls;

exhausting cool moist air from the wet side of said first indirect evaporating film heat exchanger having separated dry and wet side walls;

conveying said cool dry air to said air compressor and then to said combustion chamber; and, conveying said cool moist air to said intercooler for heat exchange between said intercooler and said cool moist air.

9. In the method of claim 8 wherein a third compressor is utilized for gas compression and a second intercooler connecting said second and third compressors is utilized, the further improvement comprising conveying said cool moist air to said second intercooler for providing heat exchange between said second intercooler and said cool moist air.

10. In the method of claim 8, the further improvement comprising:

using cool dry air output from a second evaporating film heat exchanger as input air to said first evaporating film heat exchanger; and combining cool moist air output from said second evaporating film heat exchanger with said cool moist air from said first evaporating film heat exchanger.

11. An improved method of supplying input air to a power turbine system utilizing at least one power turbine, a combustion chamber to supply combusted gas to drive said turbine, and an air compressor to supply compressed air to said combustion chamber, the improvement comprising:

exhausting cool dry air from the dry side of an indirect evaporating film heat exchanger having separated dry and wet side walls;

exhausting cool moist air from the wet side of an indirect evaporating film exchanger having separated dry and wet side walls;

combining said cool dry air with said cool moist air; and using said combined air as the input to said air compressor to be supplied thereby to said combustion chamber.

12. The method of claim 11, the further improvement comprising forming a film of water of predetermined thickness on said heat exchanger wet side.

13. The improvement of claim 2 wherein said thickness is about 0.1 to 2 millimeters.

14. In the method of claim 12, the further improvement comprising:

orienting said wet side wall to a vertical disposition, and applying said film of water to said wet side wall for flow by gravity thereon.

* * * * *

UNITED STATES PATENT AND TRADEMARK OFFICE
CERTIFICATE OF CORRECTION

PATENT NO. : 4,137,058
DATED : January 30, 1979
INVENTOR(S) : Leslie A. Schlom, Michael B. Dubey, Andrew J. Becwar It is certified that error appears in the above-identified patent and that said Letters Patent are hereby corrected as shown below:

Column 3, line 8, delete "circuit" and substitute --conduit--.

Signed and Sealed this

Eighth Day of May 1979

[SEAL]

Attest:

RUTH C. MASON
*Attesting Officer*

DONALD W. BANNER
*Commissioner of Patents and Trademarks*